Sept. 19, 1939.    P. H. RYLANDER    2,173,314
GRADING DEVICE
Filed Oct. 19, 1936
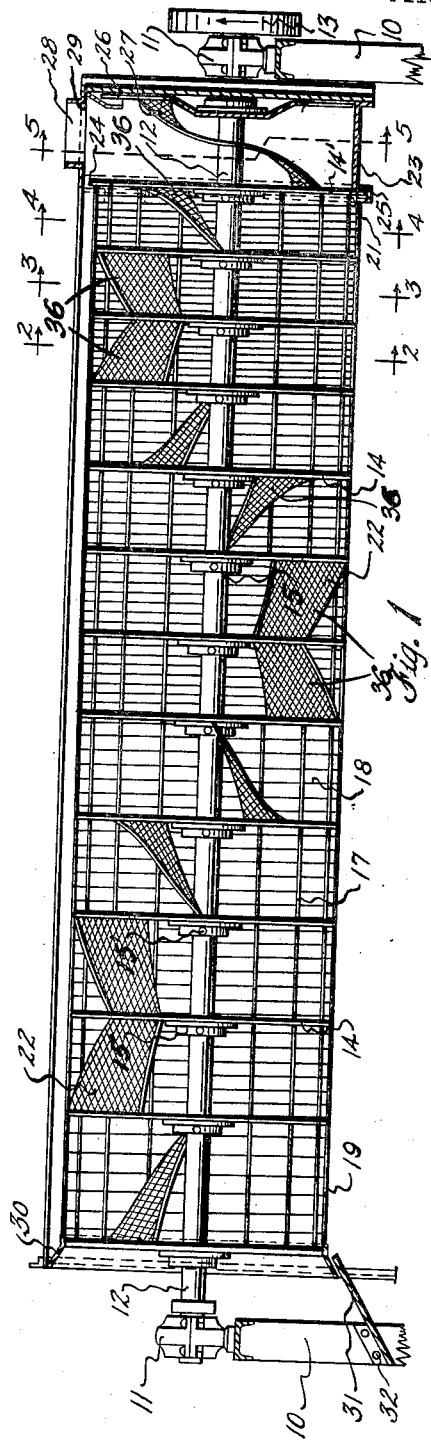
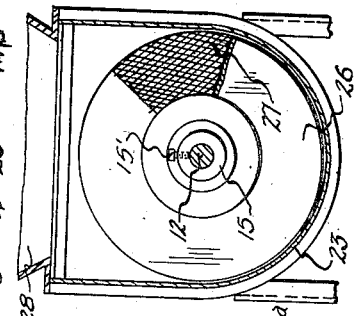
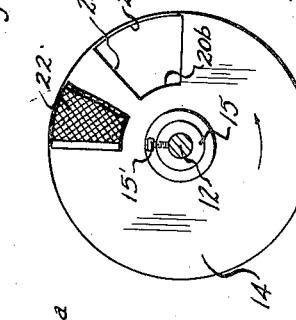
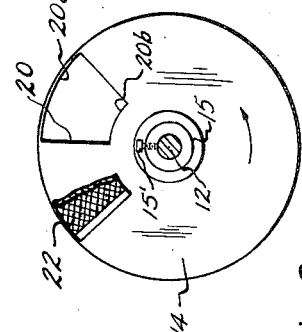
INVENTOR.
PARRISH H. RYLANDER
BY
ATTORNEY.

Patented Sept. 19, 1939

2,173,314

UNITED STATES PATENT OFFICE 2,173,314

GRADING DEVICE

Parrish H. Rylander, San Antonio, Tex.

Application October 19, 1936, Serial No. 106,289

2 Claims. (Cl. 209—98)

This invention relates to new and useful improvements in grading devices.

One object of the invention is to provide an improved device for efficiently separating or grading fruits, grain, or other loose material, according to its size.

An important object of the invention is to provide an improved grading device including, a plurality of grading compartments, each for permitting the escape, from the mass being separated, of a different grade or size of the material, with means for progressively moving the material through the compartments in a step-by-step action, whereby after the material has passed through all of the compartments, it is properly graded or separated.

Another object of the invention is to provide an improved grading device having a plurality of grading compartments through which the material to be separated is moved, the construction of the device being such that the material is fed into the compartments progressively; that is, a portion of the material is introduced into a compartment, and no more material is fed thereinto until such compartment is emptied, whereby each compartment only handles its capacity and danger of overfeeding the device and impairing its efficiency is eliminated.

A further object of the invention is to provide an improved grading device having a plurality of revolving grading compartments, and being so constructed that the material to be graded is retained in each compartment during substantially one complete revolution thereof, whereby sufficient time for efficient separation or grading in each compartment is had.

Still another object of the invention is to provide a plurality of grading compartments or chambers with improved means in each compartment for positively moving the material in said compartment into the next adjacent compartment; the compartments being readily varied in size to accommodate various materials, and said means being readily adjustable to any size compartment.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in elevation and partly in section, of a device constructed in accordance with the invention, Figure 2 is a transverse, vertical, sectional view taken on the line 2—2 of Figure 1, Figure 3 is a transverse, vertical, sectional view taken on the line 3—3 of Figure 1, Figure 4 is a transverse, vertical, sectional view taken on the line 4—4 of Figure 1, Figure 5 is a similar view taken on the line 5—5 of Figure 1, Figure 6 is an isometric view of a portion of one form of grading screen, and;

Figure 7 is a perspective view of the flight or baffle.

In the drawing the numeral 10 designates a suitable supporting frame upon which bearings 11 are mounted. An elongate shaft 12 has its ends journaled in the bearings 11 and on one end of the shaft a suitable drive or pulley wheel 13 is secured, whereby a belt or other means (not shown) may be employed to rotate the shaft.

A plurality of circular plates or disks 14 are mounted on the shaft 12. Each disk is provided with a central collar 15, through which the shaft extends, and a radial set screw 15' passes through the collar and engages the shaft to hold the disk in position thereon. The disks are suitably spaced along the shaft and a plurality of longitudinal connecting bars 17 are secured, by welding or otherwise, to the outer periphery of the disks and lie parallel to the shaft 12. The bars 17 are spaced radially around the disks. It is noted that the disks may be spaced any desired distance from each other and the spaces between the disks form a plurality of compartments extending throughout the length of the shaft.

Screen wire or other foraminous material 18 encloses the disks 14 and is secured to the longitudinal bars 17 fastened to said disks, whereby an elongate cylindrical screen drum 19 including a plurality of compartments is formed. Since the screen forming the drum is secured to the disks, which are in turn mounted on the shaft, it is obvious that rotation of the shaft will rotate the drum.

For establishing communication between the compartments in the drum, an opening 20 is provided in each disk, said opening being formed with radially extending sides 20' and ends 20a and 20b cut along arcs having radii less than the radius of the periphery of the disk. The opening is of such size and dimension that the outer end 20a of said opening lies just short of the periphery of the disk and the inner end 20b lies substantially midway between said periphery and the center of the disk. The angle between the radial sides of the opening is shown as substantially 45 degrees, but may be varied as desired.

Starting from end 21 of the drum 19, which is, as will be hereinafter described, the inlet end, the disks 14 are so positioned on the shaft 12 that the opening 20 in the next adjacent disk lies just ahead in a clockwise direction, of the opening in the previous disk. Thus, in each subsequent disk, the opening is positioned in a correspondingly progressive position, so that the opening in one disk is offset in a radial plane from the opening in the next disk, whereby the opening in each disk does not overlie any portion of the opening in the next adjacent disk. This offsetting of the openings continues regardless of the number of disks provided.

For transferring material from one compartment to the next adjacent compartment, as the drum is rotated, a suitable baffle or flight 22 is provided in each compartment. The baffle has one end secured, by bolts, rivets, or other suitable means, to the first disk 14' at the inlet side of the drum. The baffle is fastened to the face of the disk just ahead, in the direction of rotation, of the opening in said disk. The other end of the baffle is similarly secured to the next adjacent disk, being fastened along the rear edge, in the direction of rotation, of the opening. Each baffle is curved, as shown, and its outer edge lies contiguous to the peripheral screen 18 of the drum. The end of the baffle secured to the first disk leads (in the direction of rotation) the other end of the baffle, secured to the next disk, by approximately 45 degrees of rotation due to the offsetting of openings in adjacent disks. Due to this arrangement of the baffles, it will be seen that upon rotation of the drum, material within each compartment will be intercepted by the baffle, and upon further rotation, due to gravity will slide along the baffle and through the opening in the next disk into the next subsequent compartment. It will be seen that material entering a compartment will be retained within that compartment throughout substantially a complete revolution of the drum, due to the offsetting of the openings in the disks and the arrangement of the baffles.

Due to the angular displacement of the openings in the disks, material in a compartment will be evacuated therefrom by the action of the baffle approximately 45 degrees of rotation before more material is fed thereinto from the next preceding compartment. Thus, each compartment is completely emptied before additional material is fed thereinto, thereby limiting the material in each compartment and eliminating danger of overcrowding the compartment and impairing the efficiency of the device.

Surrounding the inlet end 21 of the drum 19, a U-shaped inlet housing 23 is secured to and supported by the frame 10, said housing being closed on all sides except that which receives the inlet end of the drum. It is noted that the first disk 14' at the inlet end of the drum has a greater radius than that of the drum, whereby an external annular flange 24 is formed at this end of said drum. A suitable internal channel 25 is provided in the curved lower portion of the housing to accommodate the flange 24. A disk 26 similar to the disks 14 is mounted on the shaft 12 within the housing at the closed end thereof, and an elongate flight 27 has one end secured to the disk 14' along the rear edge, in the direction of rotation, of the opening 20 in the disk 14'. A hopper or other suitable feeding means 28 is provided on the top of the U-shaped housing 23 and communicates with the interior of the housing through an opening 29 provided in the top of said housing, whereby material in the hopper will fall through the opening 29 into the housing 23. It will be seen that, upon rotation of the pulley wheel 13 in the direction of the arrow (Figures 1, 2, 3 and 4), material entering the housing 23 from the hopper 28 will be lifted on the elongate flight 27, and, due to its inclination, will slide along the flight, and pass through the opening 20 in the first disk 14' into the first compartment. As hereinbefore explained, the material will remain in this compartment during substantially a complete rotation of the drum 19. During this time, the material in the compartment which is smaller than the openings in that portion of the screen 18 covering this compartment, will fall through said portion of the screen into suitable bins or other receiving chambers, (not shown), while the material of a larger size than the openings in the screen will be retained within the compartment until intercepted by the flight 22 whereupon, as hereinbefore described, said material will be evacuated from said first compartment into the next subsequent compartment. This action is repeated for each subsequent compartment, and by suitably varying the size of the openings in the screen 18 from small to large progressively, the material passing through the drum will be graded and separated by falling therefrom through the openings in the screen.

At the outlet end of the drum 19, an outwardly inclined annular flange 30 is secured to the periphery of the end disk 14, for directing the material evacuated from the last compartment onto an inclined chute 31 which is secured by rivets 32, or other means, to the frame 10. The inner end of the chute 31 underlies the flange 30 whereby material passing from the drum over said flange will be transferred onto the chute 31.

The grading means on the drum has been described as wire screen, but, as shown in Figure 6, annular peripheral rods 35 might be secured in any suitable manner, as by welding, to the longitudinal bars 17, and by proper spacing, an efficient grading screen be formed. It is noted that the exact form of said grading means forms no part of the invention as any suitable means may be used.

The baffle 22 is preferably formed of woven wire 36 and is provided at its ends with reinforcing bars or edges 37 which may be crimped, welded, or otherwise secured, thereto for connecting said baffles to the disks. By constructing the baffle of a flexible material, it is possible to vary the distance between the disks 14, without changing or disconnecting said baffle for, manifestly, the baffle, being flexible, will assume the proper shape at any position of the disks.

With the construction shown and described herein, the material to be graded or separated is made to follow an elongate, tortuous path through the drum, whereby the efficiency of the device, in obtaining a more complete and thorough separation, is increased.

What I claim and desire to secure by Letters Patent, is:

1. A grading device including, a rotatable grading drum, a plurality of transverse partitions within said drum forming compartments, said partitions having port openings for passage of material into and from the respective compartments and each partition being adjustable longitudinally of the drum whereby the size of the compartments may be varied, and a flexible and conformable flight mounted in each compartment between the partitions for moving the material from within said compartment into the next adjacent compartment through the port opening in the intervening partition.

2. A grading device including, a rotatable grading drum, a plurality of transverse partitions within said drum forming separate compartments therebetween, said partitions having port openings respectively arranged radially in advance of each other and each partition being adjustable longitudinally of the drum whereby to vary the size of the compartments, and an inclined flight of wire mesh fabric mounted conformably in each compartment between the respective partitions to compensate for the adjustment of the partitions and correlated to the respective port openings of the partitions whereby to move the material from one compartment to the other step by step through the drum so that each compartment is emptied before more material is fed thereinto.

PARRISH H. RYLANDER.